2,833,759

DEGRADATION OF STARCH AND STARCH DERIVATIVES

Kenneth C. Hobbs, Chicago, Ralph W. Kerr and Francis E. Kite, Riverside, Ill., assignors to Corn Products Refining Company, New York, N. Y., a corporation of New Jersey No Drawing. Application December 31, 1953
Serial No. 401,732

3 Claims. (Cl. 260—233.3)

This invention relates to a process for degrading of various carbohydrates, such as starch and starch derivatives and compounds containing multiple hydroxyls, and to the products produced thereby. More particularly it relates to degradation of starch and starch derivatives with oxygen in the presence of hydrated lime, the purpose being to reduce the viscosity of the starch or derivative or, to use the commercial term, render it "thin boiling."

Starch products which have a reduced viscosity are used extensively in certain industries, e. g., sizing, adhesive. Reduced viscosity permits the use of more carbohydrate dry substance than is possible with raw starch and pastes made from thin boiling starch products will be fluid enough to be workable.

At present the bulk of thin boiling products are produced by acid modification procedures wherein starch is stirred in dilute acid, usually from 0.1 to 0.2 N, at 45 to 55° C., for periods ranging from about 6 to 20 hours, depending upon the degree of modification desired. Due to the corrosive nature of the dilute acid employed in the process, materials of construction have always been a problem. Although there is a current trend toward use of costly acid resistant metal tanks, in the past, wooden tanks have been used almost exclusively in spite of high maintenance costs, product losses resulting from leaks and product contamination. Since the process relating to the present invention embraces no acid modification step, corrosion problems are greatly reduced.

When acid modification is used for producing thin boiling starch products, degradation thereof can be neither started nor stopped nor can the rate be altered conveniently without the costly addition of either acid or base. To produce a starch product having a desired paste viscosity level requires the services of a technician highly skilled in the art of rapidly determining product viscosities during the course of acid modification and then predicting, at least 30 minutes in advance, the time when the starch slurry should be neutralized to stop modification. Time usually does not permit rectification of mistakes. Frequently the finished product does not have the desired paste viscosity and occasionally products are produced which are entirely unacceptable for the intended application and are rejected. Most of these disadvantages are overcome by the present invention.

Starch derivatives such as starch ethers show great promise as textile and paper sizes, their pastes being more stable against retrogradation than starch pastes. If acid is used to render these pastes thin boiling for the reason aforementioned substantially the same problems are encountered, as described in connection with acid modification of starch itself. Furthermore, there is an additional step required to reduce the paste viscosity of the starch ether which, of course, adds to the cost of the desired product. Obviously, if the etherification and thinning could be accomplished in one step there would be a great saving in production costs.

It is an object of this invention to provide a new and improved process for making starch products with lower paste viscosity than the products from which they are derived. Another object is to provide a process for either step-wise or continuous controlled degradation of starch and starch derivatives. Yet another object is to provide a process wherein starch can be degraded and derivatized concurrently. A further object is to provide a low cost process for the production of starch products, particularly starch ethers, having paste viscosities which may be controlled so as to be anywhere from slightly below to only a small percentage of that of the starting material. Yet a further object is to provide a process whereby these degraded starch products may be produced in substantially pure form. Still a further object is to provide a process for production of degraded starch products which produce pastes having better clarity and a retarded rate of retrogradation when compared with those of products which have been acid modified to equivalent viscosity levels by conventional procedure. Still a further object is to provide an improved process for degrading cellulose. Still a further object is to provide a method for oxidation of hydroxy or polyhydroxyalkyl compounds. Other objects will appear hereinafter.

The present invention is based upon the discovery that when an aqueous slurry of starch or of a starch derivative in granular form or a starch paste, each containing hydrated lime is exposed to air, oxygen is consumed and degradation of starch proceeds very rapidly. Rate of degradation was found to increase with temperature, alkalinity and air supply. It was discovered that both the rate and the degree of degradation could be controlled by proper control of these variables. Since air supply can be varied greatly at small cost, utilization of this variable for viscosity control has been found very convenient and advantageous. If was further discovered that starch may be derivatized, for example, etherified, and the starch ether degraded at the same time by carrying out the etherification with lime as a catalyst and introducing air into the reaction mixture.

Starch pastes containing alkali hydroxides have been known to show relatively small decrease in viscosity under most conditions, particularly on prolonged heating or when strongly agitated or worked. It has been known for many years that simple carbohydrates, such as sugars, are degraded although slowly when exposed to air under alkaline conditions, but starch has been considered remarkably stable with respect to oxidative cleavage molecules which results in a lowering of paste viscosity.

Thus it was quite surprising to find that hydrated lime and air would produce a pronounced decrease in paste viscosity of starch and starch derivatives. When a slurry of granular starch containing sodium hydroxide is exposed to air, oxidative degradation of the starch is so slow that no significant decrease in paste viscosity is observed over a period of ten hours, for example, while when lime is used the degradation proceeds rapidly.

The present invention is applicable to a variety of starch products. It is applicable to all raw starches, e. g., corn (maize), grain sorghum (milo), tapioca, potato, waxy maize, modified starches and starch derivatives, e. g., starch ethers and esters. The term "starch products," as used herein, is intended to include all of the aforementioned products and any product derived from starch which it is desired to modify as to paste viscosity. The invention is also applicable to cellulose, and a variety of compounds having multiple hydroxyl groups, e. g., sucrose, methyl glucoside, glycerine polyvinyl alcohol and the like.

When it is desired to degrade starch products they may be in granular or gelatinized form. The temperature of the reaction should be below about 50° C. if it is desired to retain the starch in granular form. If the starch product is gelatinized the temperature of the reaction may be as high as 150° C. It is advantageous to use high temperatures when it is desired to use a small amount of catalyst in order to keep low the concentration of salt in the finished product. The temperature will depend upon the amount of catalyst and air, the time, and the desired degree of degradation. For all practical purposes the temperature need not be higher than about 150° C.

The rate of degradation increases with increased amount of hydrated lime, air and increased temperature. Aside from the fact that amounts of hydrated lime in excess of 0.08 mole per anhydroglucose unit, when the temperature is above about 45 to 50° C. will cause granular starch products to become slimy and difficult to wash in case the end product is desired in granular form, the amount of hydrated lime is not critical as concerns starch products. For practical operating conditions 0.01 to 0.1 mole of catalyst per anhydroglucose unit is satisfactory. The same considerations are applicable to the other materials aforementioned.

The invention will be further illustrated by examples which are intended as typical and informative only and in no way limit the invention.

EXAMPLE 1.—OXIDATIVE DEGRADATION OF HYDROXYETHYL STARCH

A slurry of 4.02 g. of hydrated lime (assay=92 percent) in 28 ml. of water was added to a slurry containing 162 g. of grain sorghum starch in 222 ml. of water. With the slurry temperature being held constant at 46° C., the pressure in the reaction flask was reduced to an absolute pressure of 299.5 mm. Hg. The pressure due to water vapor was 76.0 mm. Hg and that due to air was 223.5 mm. Hg. After addition of 3.970 g. of ethylene oxide and 20 minutes of reaction, the total internal pressure was 402.5 mm. Hg. After 400 minutes of reaction, the total pressure was 285.5 mm. Hg, or 14 mm. Hg below the initial pressure before the oxide was added. After 1060 minutes of reaction, the pressure was 39.5 mm. Hg below the initial pressure and appeared to remain constant at this level.

Since these results indicated that oxygen was being removed from the air present in the reaction flask, the internal pressure was reduced until water began to distil to remove traces of unreacted ethylene oxide and then air was admitted until the absolute pressure was 300.0 mm. Hg. Data recorded are shown in Table I.

*Table I*

REACTION OF ATMOSPHERIC OXYGEN WITH STARCH IN AQUEOUS SLURRIES CONTAINING HYDRATED LIME

| Elapsed Time (min.) | Temperature (° C.) | Total Pressure (mm. Hg) | Pressure Drop (mm. Hg) |
| --- | --- | --- | --- |
| 0 | 46.1 | 300.0 | 0 |
| 40 | 46.1 | 291.5 | 8.5 |
| 80 | 46.1 | 286.0 | 14.0 |
| 140 | 46.1 | 279.5 | 20.5 |
| 240 | 46.1 | 272.0 | 28.0 |
| 360 | 46.1 | 266.5 | 33.5 |
| 420 | 46.1 | 264.5 | 35.5 |
| 1,380 | 46.1 | 254.5 | 45.5 |
| 1,460 | 46.1 | 254.5 | 45.5 |

The drop in pressure shown in Table I represents 20.3 percent of the initial partial pressure due to air and this percentage is close to the actual oxygen content of air.

Whereas the paste fluidity of the original starch was zero, that of the neutralized and purified product from the above experiment was 13 showing that the product had been degraded.

EXAMPLE 2.—COMPARISON OF HYDRATED LIME AND SODIUM HYDROXIDE AS CATALYSTS FOR OXIDATIVE DEGRADATION OF STARCH

In order to demonstrate that hydrated lime is a much more effective catalyst than NaOH for the oxidative degradation of starch, three experiments were conducted at equal alkalinity levels but at different slurry pH levels. In each experiment, the reaction mixture contained 162 g. of grain sorghum starch, 250 ml. of water and 0.0482 equivalent of alkali. Sodium chloride was added to one mixture to suppress the pH level. Each reaction mixture was prepared in a reaction flask equipped with a gas-inlet tube, a sealed mechanical stirrer and a closed-end manometer. In each experiment the flask was placed in a water bath at 46° C. and the internal pressure was reduced to 76.0 mm. Hg. Then air was admitted until the total internal pressure was 300 mm. Hg and pressure readings were recorded at various time intervals. A summary of data obtained in these experiments, including paste fluidities of the final purified products, is shown in Table II.

*Table II*

OXIDATIVE DEGRADATION OF GRAIN SORGHUM STARCH AT 46° C.

| Catalyst Added | | Initial Slurry pH | Reaction Time (hr.) | Half-Life of Oxygen (hr.) | Oxygen Consumed (millimole) | Paste Fluidity of Product |
| --- | --- | --- | --- | --- | --- | --- |
| Kind | Mole | | | | | |
| NaOH | 0.0482 | 11.04 | 28.0 | 8.6 | 0.67 | 3 |
| NaCl | 0.17 | | | | | |
| Ca(OH)₂ | 0.0241 | 11.64 | 23.5 | 2.7 | 0.70 | 16 |
| NaOH | 0.0482 | 11.96 | 46 | 8.5 | 0.70 | 4 |

These data show that even though the amount of oxygen consumed was nearly the same in all three experiments, degradation of the starch was much faster and more extensive with hydrated lime with sodium hydroxide as catalyst.

EXAMPLE 3.—OXIDATIVE DEGRADATION OF GRAIN SORGHUM STARCH BY HYDRATED LIME AND PURE OXYGEN

Conditions described under Example 2 were repeated except that 0.05 mole of hydrated lime was employed and 7.6 millimoles of pure oxygen was added. After 24 hours the oxygen had been completely consumed and the fluidity of the purified and isolated product was found to be 78.

EXAMPLE 4.—SIMULTANEOUS HYDROXYETHYLATION AND OXIDATIVE DEGRADATION OF GRAIN SORGHUM STARCH

In a semi-plant scale preparation of degraded hydroxyethyl starch, a 39° Bé. slurry of grain sorghum starch was treated with 0.05 mole of hydrated lime and 0.09 mole of ethylene oxide per glucose residue. Reaction was conducted in a covered wooden tank but air was not excluded. After 12 hours of reaction at 40 to 45° C. the product was neutralized, filtered, washed and dried. Analysis showed that the product had a fluidity level of 53.

In a similar preparation air was excluded. After 12 hours of hydroxyethylation, the product was found to have a 13 g.–50 ml. Scott viscosity of 73, equivalent to a fluidity level of zero. In order to degrade the product from this batch to a more commercially desirable fluidity level by the conventional acid modification procedure, the alkaline catalyst employed for hydroxyethylation had to be neutralized with hydrochloric acid, sufficient acid had to be added to react with unreacted ethylene oxide and then the slurry had to be acidified to a pH level of 1.0. After about 8 hours of additional stirring at 45° C. the desired fluidity level, which was 65 in this particular case, had been reached so the product was neutralized, filtered, washed and dried. Obviously, in the preparation of these products the former process involving alkaline oxidative degradation required less time, less chemicals, less equipment and less manpower than the latter process.

EXAMPLE 5.—SIMULTANEOUS HYDROXYPROPYLATION AND OXIDATIVE DEGRADATION OF GRAIN SORGHUM STARCH

To a slurry containing 324 g. of grain sorghum starch, 450 ml. of water and 7.4 g. of calcium hydroxide was added 11.60 g. of propylene oxide. Reaction was conducted for 6 hours at 50° C. under reduced pressure and then a portion of the mixture was removed, neutralized and the product filtered, washed and dried. Other samples were removed and similarly treated after 8, 12 and 16 hours of reaction but air was not excluded from the reaction flask after removal of the 6-hour sample. Data presented in Table III show that during the final 10 hours of the reaction period a very substantial amount of additional derivatization occurred and at the same time the product was being catalytically oxidized to industrially important fluidity levels.

*Table III*

SIMULTANEOUS HYDROXYPROPYLATION AND OXIDATIVE DEGRADATION OF GRAIN SORGHUM STARCH

| Reaction Time (hrs.) | Hydroxypropyl Groups Per Glucose Residue | Paste Fluidity |
|---|---|---|
| 6 | 0.033 | 5 |
| 8 | .037 | 43 |
| 12 | .042 | 62 |
| 16 | .049 | 74 |

EXAMPLE 6.—OXIDATIVE DEGRADATION OF CORN STARCH

In this example a technique is demonstrated whereby a product having a definite desired paste viscosity can be produced by means of this invention. A slurry containing 1620 g. of unmodified corn starch, 2500 ml. of water and 40 g. of hydrated lime was prepared in a wide-mouth one-gallon bottle which was placed in a water bath at 45° C. Air was stirred into the slurry by using a high-speed propeller type agitator placed a short distance below the surface of the slurry. Wet process Scott viscosities were run and these results were plotted against time of modification. These control determinations indicated that after 190, 310, 500 and 1470 minutes of modification the product fluidity levels were 49, 65, 75 and 81, respectively. Samples of product actually isolated, neutralized, filtered, washed and dried at these times were found to have fluidity levels of 47, 64, 74 and 83, respectively. Pastes of these products had better hot paste clarity and appeared to retrograde more slowly on cooling than pastes of products which had been acid modified to the same fluidity levels.

EXAMPLE 7.—OXIDATIVE DEGRADATION OF A STARCH PASTE

A slurry containing 24.95 g. of grain sorghum starch, 0.12 g. of hydrated lime (0.01 mole per anhydroglucose unit) and 284 ml. of water was heated for 10 minutes at 95° C. with continuous stirring and continuous addition of oxygen through a fritted glass filter stick. The resultant paste was made up to the original weight by addition of water and then a Scott viscosity was run. This value on a 28.35 g.-100 ml. basis was 46, equivalent to a fluidity value of 44.

EXAMPLE 8.—DEGRADATION OF WAXY MAIZE STARCH

A slurry containing 162 g. of waxy maize starch, 4.0 g. of hydrated lime and 350 ml. of water was maintained at 46° C. for 32 hours while the slurry was stirred under an atmosphere of oxygen. (Due to abnormal granule swelling of waxy maize starch in water, 350 ml. of water was required to produce a free flowing slurry.) During the reaction period 13.6 millimoles of oxygen were consumed. The Scott value on 75 g. of the treated starch in 100 ml of water was 40 seconds, equivalent to a fluidity value of 82.

EXAMPLE 9

The example illustrates the effect of hydrated lime and oxygen at 46° C. on sucrose, methyl α-D-glucoside and glycerine. The reactions were carried out similarly to Example 8. The consumption of oxygen and formation of carboxyl groups indicate the amount of degradation. The results are shown in Table IV below.

EXAMPLE 10

Polyvinyl alcohol was subjected to the action of hydrated lime and oxygen in a manner comparable to that of Example 9. Oxygen was consumed at about the same rate as by glycerine.

*Table IV*

| | Sucrose | Methyl α-D-Glucoside | Glycerine |
|---|---|---|---|
| Reaction Mixture Composition | | | |
| Compound treated (g.) | 171 | 194 | 92 |
| Water (ml.) | 250 | 250 | 250 |
| Ca(OH)$_2$ (millimole) | 50 | 50 | 50 |
| Free space in reaction flask (ml.) | 265 | 250 | 305 |
| Reaction time (hr.) | 24.2 | 25.3 | 40.7 |
| Pressure drop (mm. Hg) | 578 | 595 | 380 |
| Oxygen consumed (millimole) | 7.7 | 7.5 | 5.8 |
| Reaction mixture pH | 11.22 | 11.67 | 12. |
| Loss in alkalinity (ml. 1.00 N HCl) | 15.5 | 13.3 | 5. |
| Half-life of oxygen (hr.) [a] | 5.8 | 4.7 | 32. |
| Carboxyl groups per mole of oxygen | 1.9 | 1.9 | 1.3 |

[a] Half-life of oxygen will vary with the free space and also with loss in alkalinity. These figures are presented to indicate relative reaction rates and represent reaction time required for the partial pressure due to oxygen to diminish to half the original value under these experimental conditions.

We claim:
1. A process for preparing a degraded hydroxyalkyl starch ether which comprises etherifying starch with an alkylene oxide in an aqueous system containing hydrated lime, said etherification being carried out while stirring in a stream of molecular oxygen and at a temperature not exceeding about 50° C.

2. Process according to claim 1 wherein the amount of hydrated lime is 0.01 to 0.1 mole per anhydroglucose unit.

3. A process for preparing thin-boiling starch in original, insoluble granule form which comprises reacting starch in original granule form in an aqueous system containing hydrated lime, while stirring in a stream of gas containing molecular oxygen, the amount of lime not exceeding about 0.1 mole per anhydroglucose unit in the starch and the temperature not exceeding about 50° C., thereafter neutralizing the lime, washing the thin-boiling starch granules with water and recovering the thin-boiling starch.

References Cited in the file of this patent
UNITED STATES PATENTS

| 1,649,269 | Van Scoyoc et al. | Nov. 15, 1927 |
| 2,194,216 | Coppock | Mar. 19, 1940 |

OTHER REFERENCES

Meyer et al.: Helv. Chim. Acta 23, 847 (1940).
Radley: "The Oxidation of Starch," Manufacturing Chemist and Manufacturing Perfumer, July 1942, XIII 7 (pp. 158–166).